United States Patent [19]

Clawson et al.

[11] Patent Number: 5,005,383

[45] Date of Patent: Apr. 9, 1991

[54] WASHING MACHINE MOTOR WITH HIGH ROTOR RESISTANCE

[75] Inventors: Lawrence G. Clawson, Dover; Joseph R. Adamski, Sudbury, both of Mass.

[73] Assignee: Raytheon Company, Lexington, Mass.

[21] Appl. No.: 478,314

[22] Filed: Feb. 12, 1990

[51] Int. Cl.⁵ .................... D06F 1/00; D06F 37/38
[52] U.S. Cl. ............................. 68/133; 68/23.7
[58] Field of Search ............... 68/23.7, 133; 310/184, 310/68 R

[56] References Cited

U.S. PATENT DOCUMENTS

| | | | |
|---|---|---|---|
| 4,662,193 | 5/1987 | Honda | 68/133 |
| 4,765,160 | 8/1986 | Yamamoto et al. | 68/133 |
| 4,779,431 | 10/1988 | Burk et al. | |
| 4,806,717 | 2/1989 | Hershberger | 310/184 |
| 4,886,990 | 12/1989 | Barker | 68/133 |
| 4,910,979 | 3/1990 | Burk et al. | 68/133 |

Primary Examiner—William A. Cuchlinski, Jr.
Assistant Examiner—G. Bradley Bennett
Attorney, Agent, or Firm—William R. Clark; Richard M. Sharkansky

[57] ABSTRACT

A washing machine motor having a high resistance rotor to provide high starting torque and low starting current. The permanent split capacitor motor is linked by a speed reducer to the agitator, and a controller alternately reverses the drive direction of the motor to provide the agitator with a relatively high stroke rate such as 60 strokes per minute. In such application, the motor runs cooler than a conventional motor with low rotor resistance because the frequency of starts is high, and, notwithstanding the fact that a high rotor resistance motor is inefficient at running speed, the high rotor resistance motor generates less heat in the critical thermal loading start-up mode.

5 Claims, 6 Drawing Sheets

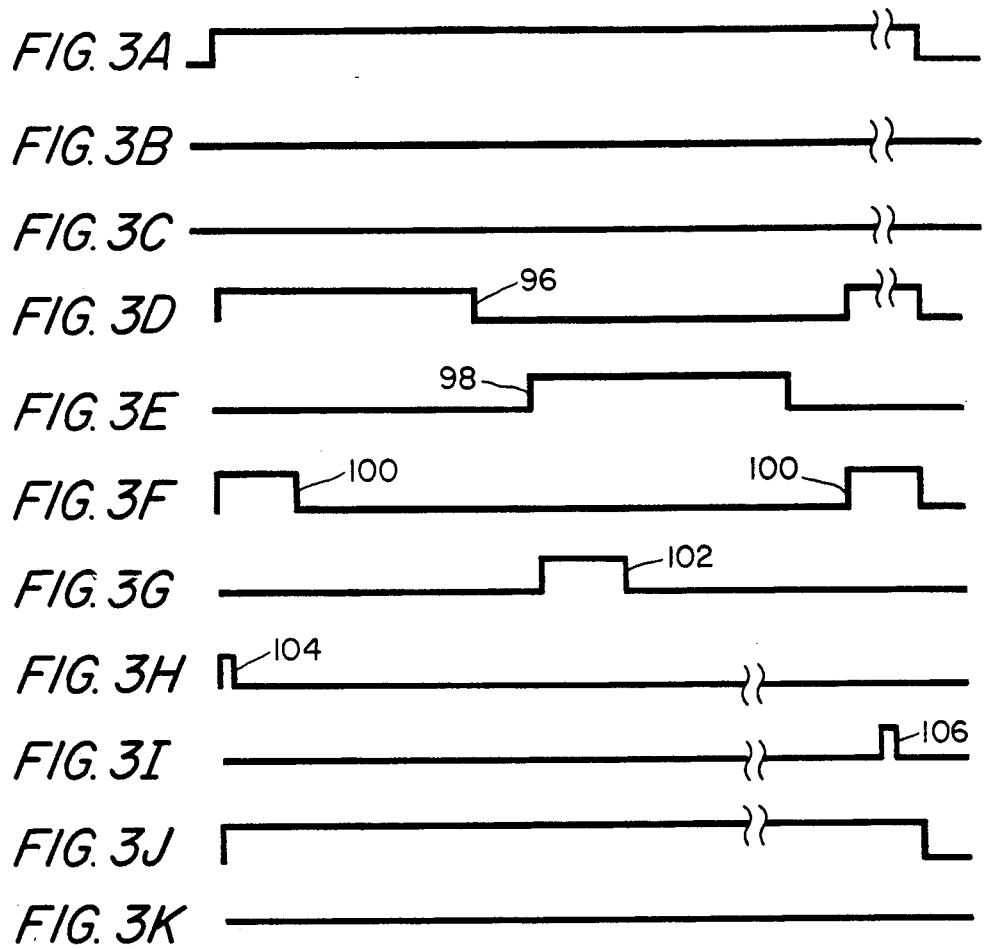
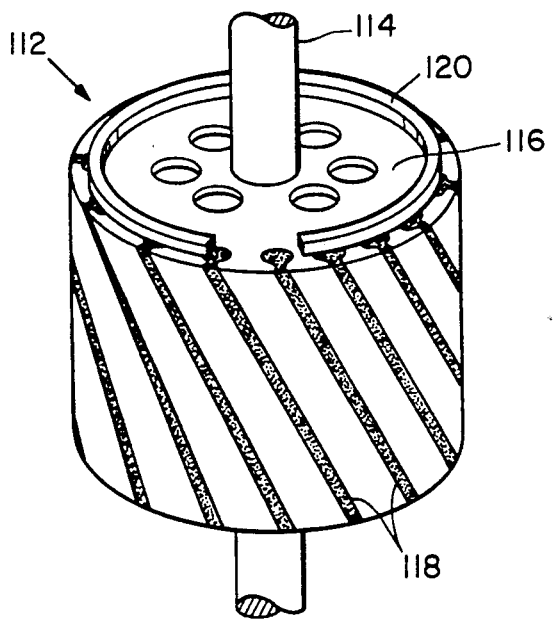
FIG. 4

WASHING MACHINE MOTOR WITH HIGH ROTOR RESISTANCE

BACKGROUND OF THE INVENTION

The present invention generally relates to an agitator drive system for use in an automatic clothes washer, and more particularly relates to such a system embodying an alternately reversing drive motor.

Most commercially available top loading washing machines have an agitator that is connected to a reciprocating transmission driven unidirectionally by a motor. That is, the motor is typically a conventional constant speed, resistance-start induction motor that continuously drives the input shaft of the transmission in one direction, and in response thereto, the oscillating or periodic reversing transmission drives the tub mounted clothes agitator in one direction and then in the opposite direction. Although such transmissions are generally effective for their intended purpose of alternating the drive direction to provide back and forth agitator strokes, the transmissions are complicated mechanisms that are relatively expensive to manufacture.

A recent commercially available agitating clothes washer uses a reversing motor and a simple speed reducer to drive the agitator. Because the reversing action is provided by the motor itself, this system has the advantage of eliminating the need for an expensive and complex reciprocating transmission. The motor is a permanent split capacitor (PSC) motor that is substantially identical in size and material to the standard commonly used resistance-start induction motor of transmission drive washers, except that a run capacitor is required. This washer operates at about 20 agitation cycles or strokes per minute which is very low as compared to most transmission drive washers which may, for example, operate at 60 or more strokes per minute. Accordingly, the clothes may not be cleaned so well as with a higher stroke rate. Further, it has been found that when the stroke rate of this washer is increased two or three times (e.g. 40-60 strokes per minute) with a corresponding factor reduction in stroke angle, the motor operates above an acceptable operating temperature. Overheating apparently results because there are more start-ups at the higher stroke rate, and considerably more heat is generated in starting a motor than operating it at its running speed. As is well known, the operating temperature of a motor is closely associated with its life expectancy because deterioration of the wire insulation is a function of both time and temperature. Therefore, it would generally be unacceptable to operate the motor of this washer at a relatively high temperature. The operating temperature of the motor could be reduced by increasing the size of the motor or the copper in the windings, but such approaches would add considerably to the cost of the washer.

Summary of the Invention

In accordance with the invention, there is provided a drive system for an automatic clothes washer having an agitator mounted within the tub, comprising a motor mounted within the automatic washer, speed reducer means for linking the motor to rotate the agitator, a control circuit connected to operate the motor in first and second opposite directions, the control circuit comprising means of alternating motor operation in the first and second directions, the alternating means interrupting operation of the motor between each direction reversal so that the agitator comes to a stop and then is accelerated to a predetermined angular speed in the opposite direction, the motor comprising means comprising a high resistance rotor for providing high starting torque and low starting current to minimize the heat generated by the motor in accelerating the agitator from a stop up to the predetermined angular speed. It may be preferable that the motor be a permanent split capacitor motor. Also, it may be preferable that the agitator be driven by the motor at a stroke rate of 50-70 strokes per minute. Also, it may be preferable that the control circuit provide drive pulses each having a duration from 0.3 to 0.5 seconds for driving the agitator in either direction, the agitator being at a substantially constant angular speed for most of the duration of the pulse.

With such arrangement, the clothes agitator is reciprocated by a reversing permanent split capacitor motor thereby eliminating the need for an expensive reciprocating transmission, and by using a motor with relatively high rotor resistance, the motor can be reversed at a relatively high stroke rate such as 60 strokes per minute without overheating the motor. Notwithstanding the fact that high rotor resistance lowers efficiency at running speed, it has the advantage of increasing starting torque and reducing starting current as compared to the standard low rotor resistance. It has been found that in the particular application of an alternately reversing motor used to drive an agitator at a relatively high stroke rate (e.g. 60 strokes per minute) wherein the motor spends a significant percentage of time in the starting and low speed modes of operation, the motor runs cooler with high rotor resistance. Substantially more current is drawn in starting a permanent split capacitor motor than operating it at running speed, so this is the critical time period for thermal loading. Increasing the rotor resistance so as to decrease the heat generated during this critical period more than compensates for the lower efficiency at running speed due to high rotor resistance, and as a result, the motor runs cooler in this application.

The rotor resistance of one particular motor was increased from 11 ohms to 35 ohms by machining the end rings from 0.153' down to 0.050'. By such modification, the locked rotor amps were reduced from 6.0 amps to 5.4 amps, while the idle amps increased from 2.17 amps to 2.19 amps. As a result, the motor operated at a substantially reduced temperature.

BRIEF DESCRIPTION OF THE DRAWINGS

The foregoing objects and advantages of the invention will be more fully understood by reading the Description of the Preferred Embodiment with reference to the drawings wherein:

FIGS. 3A-K are control signals for the controller;

FIG. 4 is a perspective view of the rotor of the motor with end ring partially broken away;

DESCRIPTION OF THE PREFERRED EMBODIMENTS

Figure 1:
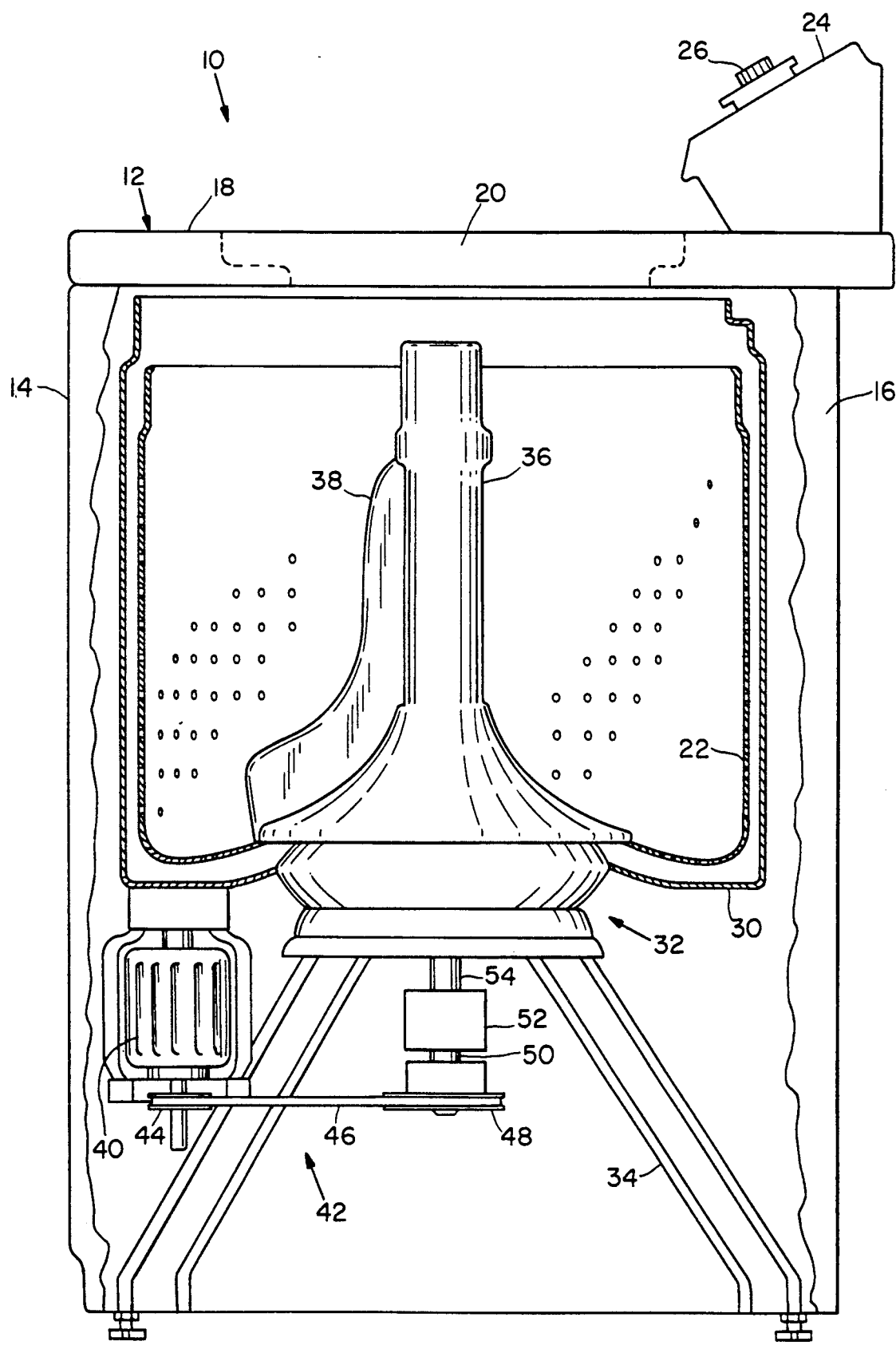
FIG. 1 is a partially broken away side view of a washing machine.

Referring specifically to FIG. 1, a top-loading, agitator type washing machine 10 has an outer cabinet 12 that includes a front panel 14, side panels 16, and a top panel 18 having an opening 20 through which clothes are loaded to and unloaded from a rotatable perforated clothes basket 22. A control console 24 is positioned at the rear of top panel 18, and includes a rotary control knob 26 that is interconnected to an electrical mechanical timer 28 (FIG. 2) which, as will be described in detail, automatically controls the washing machine 10 through a preprogrammed sequence of operations such as water fill, agitate, spin, and rinse fill.

Still referring to FIG. 1, perforated clothes basket 22 is positioned within tub 30 that is seated on a suspension 32 that is supported in spaced relationship from the bottom of the washing machine 10 by a plurality of legs 34. A vertically disposed agitator 36 having a plurality of vanes 38 is positioned within perforated clothes basket 22.

Motor 40 is suitably mounted below tub 30 and is connected by a pulley arrangement 42 including drive pulley 44, belt 46, and driven pulley 48 to the input shaft 50 of speed reducer 52 which, for example, may be a planetary gear drive. The output shaft 54 of speed reducer 52 is linked to agitator 36 and, in response to the alternately reversing drive of motor 40 during an agitate cycle, agitator 36 is oscillated back and forth about its vertical axis. In an alternate arrangement, a suitably designed motor 40 could be connected directly to shaft 54 such that pulley arrangement 42 and speed reducer 52 could be eliminated. As will be described in detail later herein, motor 40 is a permanent split capacitor (PSC) motor that has relatively high rotor resistance to provide relatively high starting torque and low starting current.

Figure 2:
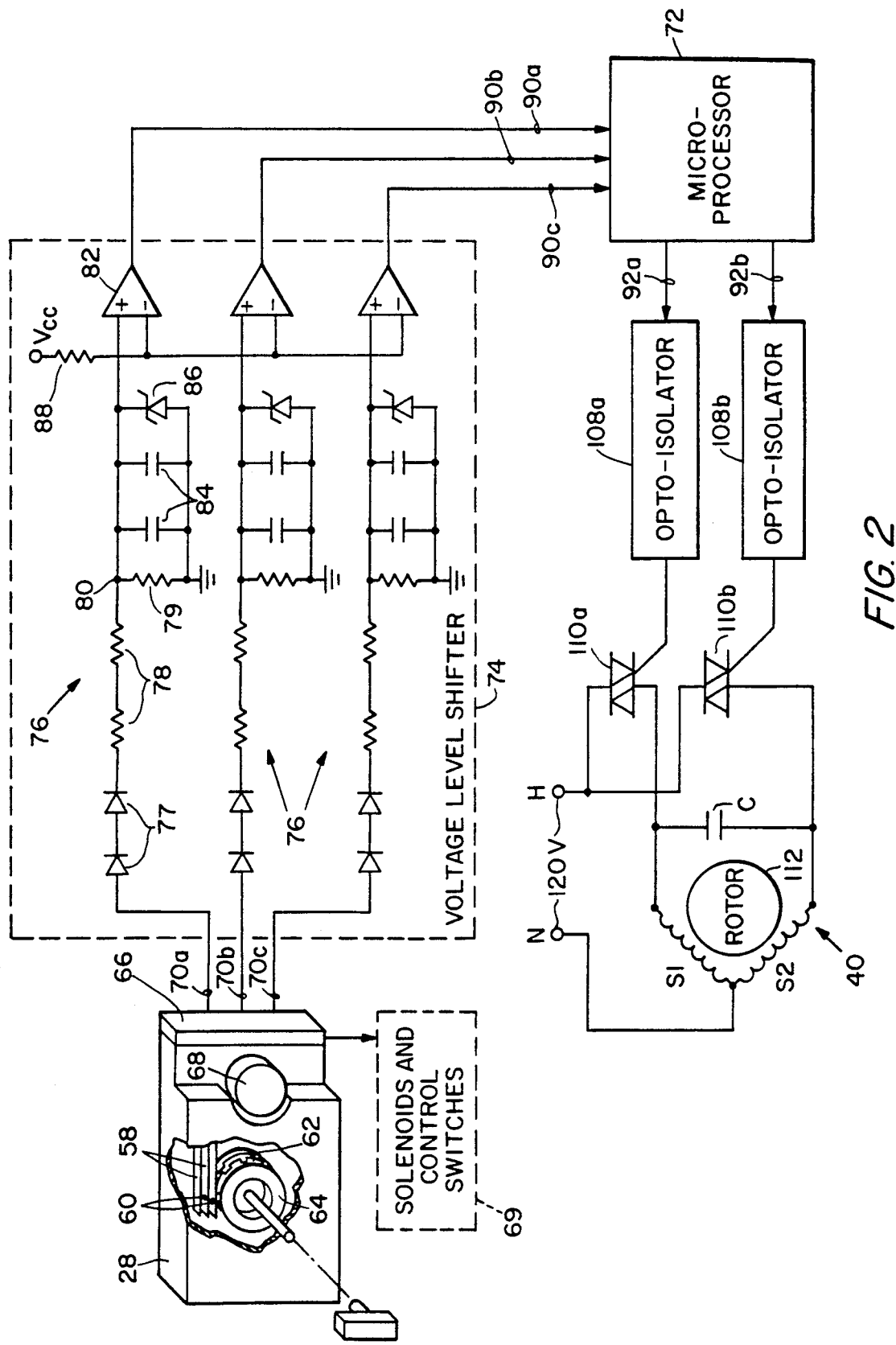
FIG. 2 is a schematic diagram of the controller for the washing machine.

Referring to FIG. 2, a conventional electromechanical timer 28 includes a plurality of stacked rows of conductor fingers 58 having contacts 60 that, in response to the timing cams 62 on plastic wheel 64, are opened and closed in a predetermined sequence to provide 120 VAC line voltage to terminal 66. More specifically, timer motor 68 operates to rotate wheel 64 and the timed cams 62 push against the conductor fingers 58 to open and close the switches of contacts 60 at preprogrammed times so as to energize the various washing machine components and thereby execute the various sequential washing operations. Terminal 66 of electromechanical timer 28 is connected to conventional solenoids and control switches 69 such as temperature selector switch, hot and cold water mixing valve solenoids, lid switch, pressure switch, and unbalance switch. In this manner, electromechanical timer 28 continues to carry on conventional interface and control functions to electrical devices with the exception of motor 40. Electromechanical timer 28 also provides control signals through terminal 66 to control lines 70a-c so as to indicate a specific operating mode for motor 40, and also to control the overall time duration. For example, a signal such as 120 VAC line voltage or a DC voltage on line 70a could indicate a REGULAR wash stroke and a signal on line 70b could indicate a SPIN cycle; in both cases, the duration of the motor operation could, for example, be indicated by the duration of the signal. More preferably, the timer cams 62 on wheel 64 are modified from the conventional arrangement so as to provide an encoded (e.g. binary encoded) signal on lines 70a-c, which signal indicates the operating profile and/or duration for motor 40. The advantage of encoding the signal is, of course, that more information can be transmitted on fewer control lines. For example, the presence of an AC line voltage signal on line 70a and the absence of AC line voltage signals on lines 70b and 70c could indicate the selection of a REGULAR agitate cycle. Also, the presence of an AC line voltage signal on line 70b and the absence of AC line voltage signals on lines 70a and 70c could indicate the selection of a PERMANENT PRESS agitate cycle.

Although low voltage DC signals could be provided on lines 70a-c, here 120 VAC signals are provided and they are conditioned in voltage level shifter 74 so as to be compatible as inputs to microprocessor 72. More specifically, each line 70a-c is connected through respective identical circuits 76 in voltage level shifter 74 before being coupled to microprocessor 72. Each circuit 76 includes redundant series diodes 77 that rectify the AC line voltage signal, and redundant series resistors 78 that, in combination with resistor 79 to ground provide a voltage divider for junction 80 that is connected to the positive input of comparator 82. For example, each resistor 78 may be 22K ohms and resistor 79 may be 10K ohms. Redundant capacitors 84 and zener diode 86 are connected in parallel from junction 80 to ground; capacitors 84 provide filtering and zener diode 86 limits the positive input of comparator 82 to 5 volts DC. Vcc is connected through resistor 88 to the negative input of comparator 82 such that a DC reference voltage of, for example, 2.5 volts DC is provided. Thus, each threshold comparator 82 provides a buffered output such as approximately 5 volts DC on respective lines 90a-c whenever its corresponding input on lines 70a-c is 120 VAC.

Microprocessor 72 which may, for example, be a Motorola MC68HC0502 microcontroller, functions to decode the binary encoded control signal from electromechanical timer 28 on input lines 90a-c, and, in response thereto, to provide corresponding preprogrammed motor drive pulses on lines 92a and b. The table below is typical of the control function of microprocessor 72.

| CONTROL LINE | | | | |
|---|---|---|---|---|
| a | b | c | MOTOR CYCLE | CYCLE DRIVE PROFILE (sec) |
| 0 | 0 | 0 | OFF | |
| 1 | 0 | 0 | REGULAR AGITATE | .4 CW, .1 OFF, .4 CCW, .1 OFF |
| 0 | 1 | 0 | PERM PRESS AGITATE | .15 CW, .6 OFF, .15 CCW, .6 OFF |
| 1 | 1 | 0 | DELICATE AGITATE | .075 CW, 1.425 OFF, .075 CCW, 1.425 OFF |
| 0 | 0 | 1 | HIGH SPEED SPIN | FULL POWER |

-continued

| CONTROL LINE | | | MOTOR CYCLE | CYCLE DRIVE PROFILE (sec) |
|---|---|---|---|---|
| a | b | c | | |
| 1 | 0 | 1 | LOW SPEED SPIN | HALF POWER |

For example, if the binary encoded signal 100 was output from electromechanical timer 28 on lines 70a–c and correspondingly onto control lines 90a–c, this, for example, would indicate the activation of a REGULAR agitate cycle having a duration so long as the encoded signal 100 was maintained. In response thereto, microprocessor 72 drives motor 40 in one direction 0.4 seconds, and, after 0.1 seconds off, drives motor 40 in the opposite direction 0.4 seconds followed by 0.1 seconds off. This stroke profile is then repeated for the duration of the cycle. Similarly, if control lines 90a–c are 010, a PERMANENT PRESS agitate cycle is called for, and that corresponds to driving motor 40 in one direction 0.15 seconds, 0.6 seconds OFF, 0.15 seconds in the opposite direction, and then 0.6 seconds OFF. As shown in the table, the control signal 110 calls for a DELICATE agitate wherein the reversing drive is 0.075 seconds intertimed by 1.425 seconds OFF. For HIGH SPEED SPIN, the motor 40 is driven unidirectionally with full power, and for LOW SPEED SPIN, it is driven at half power.

FIGS. 3A–C show inputs to microprocessor 40 on lines 90a–c, respectively, for a REGULAR agitate cycle, and FIGS. 3D–E show the resulting outputs on control lines 92a and b, respectively. Specially, in response to electromechanical timer 28 switching 120 VAC line voltage to line 70a, line 90a goes HI. Although other methods could be used, electromechanical timer 28 does not switch the 120 VAC line voltage off line 70a until the completion of the scheduled REGULAR agitate cycle, and this typically may occur 5–15 minutes later. As shown, line voltage is not applied to lines 70b and c. For the duration of applying 120 VAC to line 70a, microprocessor 72 switches lines 92a and 92b at a much faster rate that is suitable for rapidly driving a reversing motor in the heretofore described application. A 0.4 second gating pulse 96 is applied to line 92a, and then, after a 0.1 second off interval, a 0.4 second gating pulse 98 is applied to line 92b. This gating sequence is then continued for the 5–15 minutes that electromechanical timer 28 applies line voltage to line 70a. In other words, electromechanical timer 28 provides a higher level command or control signal for motor 40 and, in response thereto, microprocessor 72 generates much faster control signals that execute the called for function.

FIGS. 3F and 3G show the control pulses 100 and 102 on lines 92a and b, respectively, that carry out a PERM PRESS agitate cycle. The pulses have a duration of 0.15 seconds with OFF time 0.6 seconds inbetween. FIGS. 3H and 3I show the control pulses 104 and 106 on lines 92a and b, respectively, that carry out a DELICATE agitate cycle. The pulses have a duration of 0.075 seconds with OFF time 1.425 seconds inbetween. FIGS. 3J and 3K show the states of lines 92a and 92b, respectively, that carry out a HIGH SPEED SPIN. Line 92a is HI and 92b is LO. Although the rapid speed switching control is shown and described as microprocessor 72, other equivalent electronic or memory circuits could be used. Further, not all of the possible logic states on lines 90a–c have been used, and it is recognized that other motor drive algorithms could be implemented. Also, additional control lines could be used to indicate the duration of a cycle to microprocessor 72 in advance. In other words, the programmability and the rapid switching rate of microprocessor 72 can be used to provide many motor control options and flexibility.

Referring again to FIG. 2, lines 92a and b are connected to respective opto-isolators 108a and b that gate respective triacs 110a and b, or other similar high power switches. Accordingly, in response to a pulse on line 92a, triac 110a is turned on and 120 volts AC is applied to winding S1 of PSC motor 40 thereby driving the rotor 112 in one direction, here clockwise for convention. Conversely, a pulse on line 92b turns on triac 110b and 120 volts AC is applied to stator winding S2 of PSC motor 40 thereby driving rotor 112 in the counter clockwise direction for the duration of the pulse. As is well known, the permanent split capacitor C provides the phase difference between stator windings S1 and S2.

Referring to FIG. 4, the rotor 112 of the PSC motor 40 includes a shaft 114 about which is built up a core 116 of insulated steel laminations. In conventional arrangement, a plurality of individual parallel metal bars 118, typically cast aluminum, are embedded in the surface of core 116. End rings 120, here partially broken away, connect to the ends of the bars 118 and complete electrical circuits between individual bars 118. As is well known, the phase displaced by capacitor C in stator winding S1 versus stator winding S2 creates a moving field around rotor 112. This moving field induces currents in the bars 118 of the rotor 112. The currents so induced create a magnetic field that reacts against the rotating field set up by the stator windings thereby producing a torque on the rotor 112. A relatively high rotor resistance R has been provided to increase starting torque and also to draw less starting current so as to generate less heat in this relatively rapid stroke rate and quick motor reversal application. In one embodiment, the rotor resistance R of the commercially available reversing washing machine motor described in the Background was increased by machining down the rotor end rings 120. Specifically, the high rotor resistance was achieved by machining off the rotor fan blades and reducing the end rings to an outer diameter of 2.580', an inner diameter of 2.225', and a thickness of 0.041' thereby reducing the ring conduction thickness to about one-third of its original thickness.

Figure 5A:
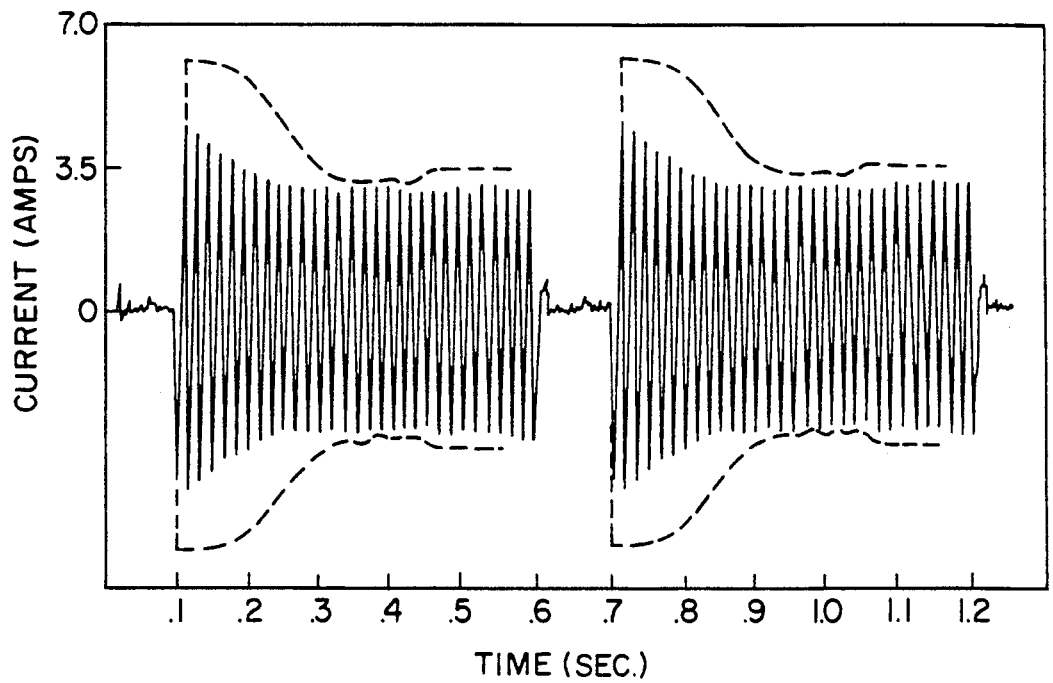
FIG. 5A is the current tracing on the neutral motor lead for a 14 lb. load using a high resistance rotor, and the dotted line shows the envelope for the current tracing of a standard low resistance rotor.

FIG. 5A shows the current tracing on the neutral lead of motor 40 with 0.5 second reversing drive pulses for the modified high resistance rotor 112 with a 14 lb. load in clothes basket 22. The dotted line in FIG. 5A shows the current tracing envelope under the same conditions for the same motor in its commercially-available configuration with low rotor resistance before machining. The unmodified motor with low rotor resistance spends approximately 0.2 seconds of the 0.50 second energization in the high current draw, low speed region while the high resistance rotor tracing shows both reduced time and lower current draw in this high current draw region. Further, the peak starting current draw for the low resistance rotor was approximately 6.5 amps and, as shown, the peak starting current draw for the high resistance rotor was significantly lower. As would be expected from these tracings, the modified high rotor resistance motor operated at a lower steady state temperature. Specifically, the steady state temperature of the high rotor resistance motor was 168° F. while the unmodified low rotor resistance motor was 180° F.

Figure 5B:
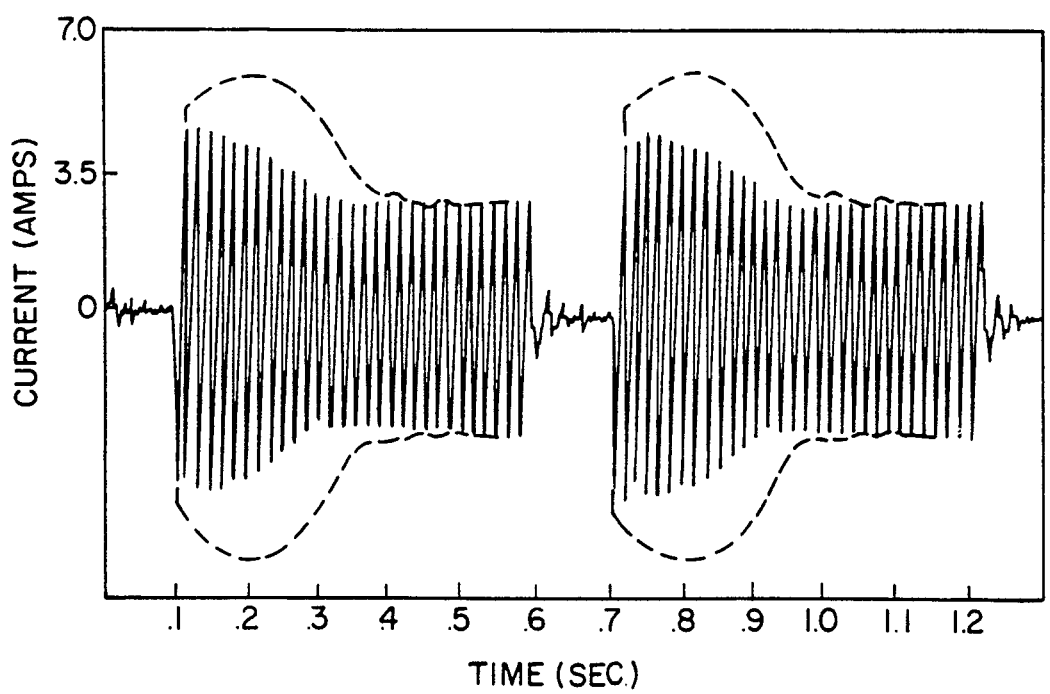
FIG. 5B shows a current tracing similar to FIG. 5A with a 4.6 lb. clothes load.

FIG. 5B shows similar tracings for the high rotor resistance motor versus the unmodified low rotor resistance motor with a 4.6 lb. clothes load. Under this operating condition, the high current draw region of the low rotor resistance motor was approximately 0.27 seconds while, as shown, the high rotor resistance motor was approximately 0.20 seconds. Also, the peak starting current of the low rotor resistance motor was approximately 6.3 amps and occurred approximately 0.1 seconds after initiation of the drive pulse. As shown, the peak starting current of the high resistance motor was significantly lower. The steady state temperature of the high rotor resistance motor was 178° F. while the unmodified motor was 205° F. The respective motor configurations may have run hotter with the lighter clothes load because the agitator 36 did not have enough drag to come to a complete stop in the 0.1 second motor OFF period before reversing, and therefore, when the motor was reversed, current was drawn in stopping the motor before it could be reversed in direction. In other words, the motor was reversing against itself.

PSC motors from several different manufacturers were studied to determine what effect increasing the resistance of rotor 112 would have on the steady state operating temperature of the motor 40 in a high stroke rate, such as 60 strokes per minute, reversing motor application. It was found that up to some limit, the operating temperature of the motors in the washing machine reversing motor application was decreased as the rotor resistance was increased. This was done without modifying the stator windings S1 and S2. Although all of the reasons for the lower operating temperature may not be easily quantized, it is well known that a low rotor resistance provides high efficiency under normal running conditions, but low rotor resistance also results in low starting torque and high starting current at a low starting power factor. Therefore, by increasing the rotor resistance, the starting torque may be increased and the starting current may be decreased at the expense of lower efficiency at higher speed. As is well known, the heat of a motor results from the $I^2R$ losses. Accordingly, by decreasing the starting current, less heat is generated in the stator windings while starting the motor, and this is a critical period for heating the motor because the starting current is substantially higher than the running current, and the effect of the fan is minimal. Also, by increasing the starting torque, less time is spent in the relatively high heat generating starting condition in getting up the speed. Simply stated, for the rapid stroke rates and quick motor reversals of this particular washing machine reversing motor application, the improved starting torque and reduced starting current draw appear to more than offset less efficient higher speed operation. In this particular motor reserving application, the motor 40 spends a significant percentage of time starting the motor, and it is advantageous to optimize the rotor resistance for this relatively high thermal loading condition.

Figure 6:
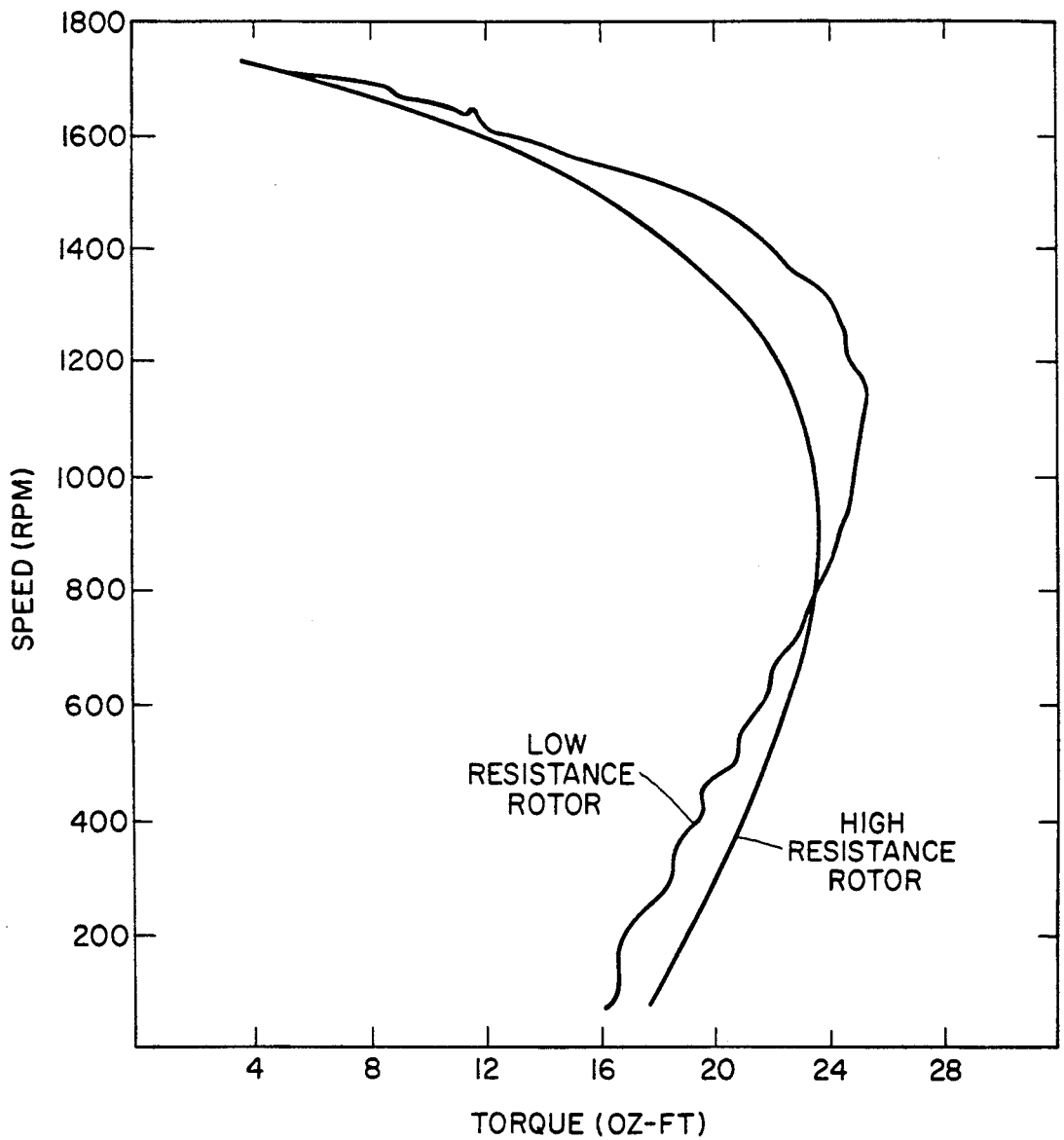
FIG. 6 is a torque/speed curve for respective motors having high and low resistance rotors.

Referring to FIG. 6, torque/speed curves are shown for one particular motor design with high rotor resistance and with low rotor resistance, as labeled. Specifically, the height of the end ring 120 before modification was 0.153', and the end ring 120 was machined down to 0.050' resulting in an increase in rotor resistance from 11 ohms to 35 ohms. As can be seen, the high rotor resistance motor has higher starting torque and therefore, in addition to drawing less starting current, also spends less time in the critical high thermal loading operation getting up to running speed. In bench tests, the unmodified low rotor resistance motor drew 6.0 locked rotor amps and 2.17 idle amps, and had 12.0 OZ-ft locked rotor torque. In contrast, the modified high rotor resistance motor drew 5.4 locked rotor amps and 2.19 idle amps, and had 14.7 OZ-ft locked rotor torque. The above measurements were made with a hot motor. The ratio of locked rotor amps to idle amps of the modified high rotor resistance motor was 2.76, while the unmodified motor was 2.46.

Figure 7:
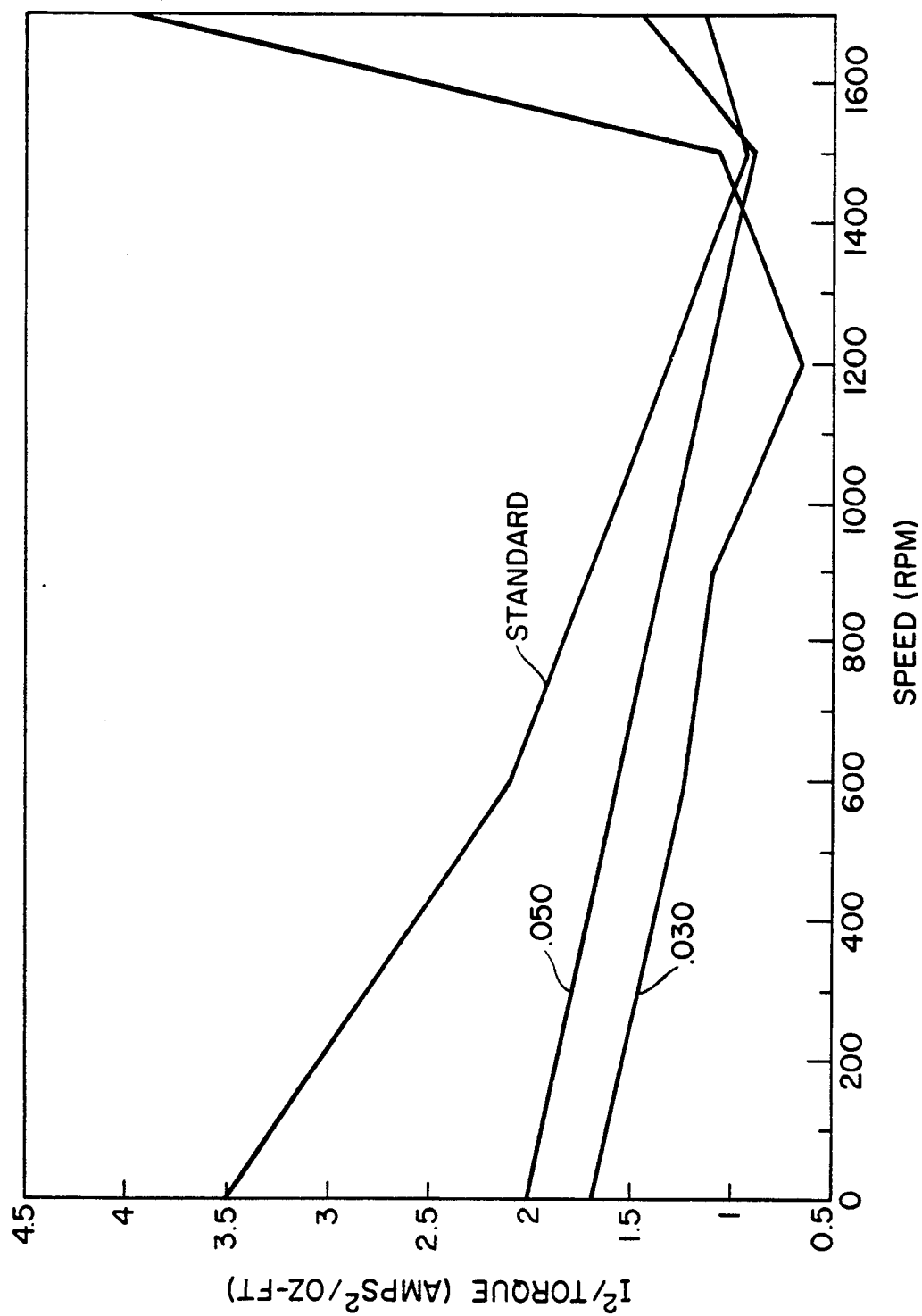
FIG. 7 is a speed versus $I^2$/torque curve for standard and high rotor resistance motors.

With reference to FIG. 7, $I^2$/torque vs. speed curves are shown for the FIG. 6 motors having the standard low resistance rotor and the modified 0.050' high resistance rotor. Also, a similar curve is shown with the rotor machined down to 0.030'. $I^2$/torque is a quality factor corresponding to the ability of the motor 40 to develop torque at low loss. As can be seen, the $I^2$/torque start-up factor for the standard or unmodified low rotor resistance motor is much higher than the motors with high rotor resistance. Further, in the region or range up to 600 rpms, the standard motor continues to have a $I^2$/torque factor significantly higher than the high rotor resistance motors, and 0.050' motor has an $I^2$/torque factor slightly higher than the 0.030' motor. Accordingly, in this range, the standard or low rotor resistance motor has much higher $I^2R$ losses and therefore generates substantially more heat per unit of torque. In the operating region or range from 600 rpms to approximately 1500 rpms, the standard or low rotor resistance motor continues to have an $I^2$/torque factor higher than either high rotor resistance motor, but the curves generally converge at approximately 1500 rpms where all three motors have approximately the same $I^2$/torque factor. As shown, the $I^2$/torque factor of the motor with a 0.030' rotor end ring rapidly degrades above 1500 rpms, while the $I^2$/torque factor of the motor with a 0.050' rotor end ring degrades less rapidly, but is still higher than the standard or low rotor resistance motor.

Those skilled in the art will recognize that the resistance of a rotor can be increased by techniques other than reducing the cross-sectional area of the end rings 120. For example, the conductivity of the bars 118 can be reduced by using different materials, or by adding impurities to the material being used.

This completes the Description of the Preferred Embodiments. However, a reading of it by those skilled in the art will bring to mind many alterations and modifications that do not depart from the spirit and scope of the invention. Accordingly, it is intended that the scope of the invention be limited only by the appended claims.

What is claimed is:

1. A washing machine comprising:
   a clothes basket having a clothes agitator;
   a permanent split capacitor motor having first and second stator windings;
   a speed reducer linked between said motor and said agitator;

control means for alternately switching line voltage to said first and second stator windings of said motor to drive said motor and said agitator in alternately reversing direction; and said motor having a high resistance rotor for increasing starting torque and reducing starting current to minimize the heat generated in said first and second stator windings while starting said motor wherein the ratio of locked rotor amps to idle amps of said motor is less than 2.5.

2. A washing machine comprising:

a clothes basket having a clothes agitator;

a permanent split capacitor motor having first and second stator windings;

a speed reducer linked between said motor and said agitator;

control means for alternately switching line voltage to said first and second stator windings of said motor to drive said motor and said agitator in alternately reversing direction; and said motor having a high resistance rotor for increasing starting torque and reducing starting current to minimize the heat generated in said first and second stator windings while starting said motor wherein the resistance of said rotor is greater than 15 ohms.

3. A washing machine comprising:

a clothes basket having a clothes agitator;

a permanent split capacitor motor having first and second stator windings;

a speed reducer linked between said motor and said agitator;

control means for alternately switching line voltage to said first and second stator windings of said motor to drive said motor and said agitator in alternately reversing direction; and said motor having a high resistance rotor for increasing starting torque and reducing starting current to minimize the heat generated in said first and second stator windings while starting said motor wherein said rotor has an end ring with a height of 0.05' or less.

4. A washing machine comprising:

a clothes basket having a clothes agitator;

a permanent split capacitor motor having first and second stator windings;

means for linking said motor to said agitator to drive said agitator;

control means for alternately switching line voltage to said first and second stator windings of said motor to alternately reverse the drive direction of said motor and said agitator at a stroke rate greater than 35 strokes per minute; and said motor comprising means for reducing the magnitude and duration of high current draw in starting said motor at the beginning of a direction reversal to minimize the heat generated by said first and second stator windings in starting said motor, said reducing means comprising a high resistance rotor providing high starting torque and low starting current wherein the resistance of said rotor is greater than 15 ohms.

5. A washing machine comprising:

a clothes basket having a clothes agitator;

a permanent split capacitor motor having first and second stator windings;

means for linking said motor to said agitator to drive said agitator;

control means for alternately switching line voltage to said first and second stator windings of said motor to alternately reverse the drive direction of said motor and said agitator at a stroke rate greater than 35 strokes per minute; and said motor comprising means for reducing the magnitude and duration of high current draw in starting said motor at the beginning of a direction reversal to minimize the heat generated by said first and second stator windings in starting said motor, said reducing means comprising a high resistance rotor providing high starting torque and low starting current wherein said motor has a ratio of locked rotor amps to idle amps of less than 2.5 .

* * * * *